Sept. 7, 1954 A. D. ODELL 2,688,695
ELECTRICAL SWITCHING CIRCUITS
Filed June 23, 1953

*Inventor*
A. D. ODELL
*By* R. P. Morris
*Attorney*

Patented Sept. 7, 1954 2,688,695

UNITED STATES PATENT OFFICE 2,688,695

ELECTRICAL SWITCHING CIRCUITS

Alexander Douglas Odell, Aldwych, London, England, assignor to International Standard Electric Corporation, New York, N. Y., a corporation of Delaware Application June 23, 1953, Serial No. 363,542

Claims priority, application Great Britain June 27, 1952

8 Claims. (Cl. 250—27)

Figure 1:
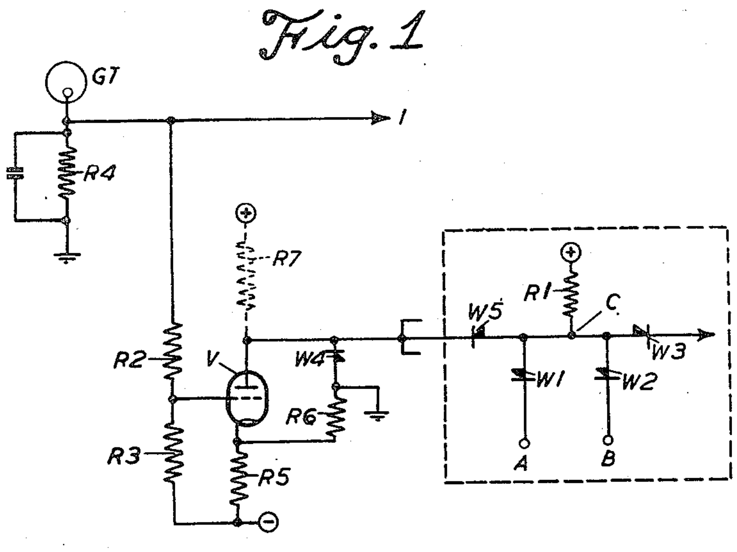

The present invention relates to electric switching circuits, and more particularly to such circuits when used to control gating circuits.

According to the present invention there is provided an electrical switching circuit which comprises a thermionic vacuum tube, a rectifier connected between the anode of said tube and a point at a first potential, said rectifier being poled in the direction of easy conductivity for current flowing from said point at said first potential towards said anode, a control point whose potential can assume either one of two values, one being a relatively negative potential which is at or near said first potential and the other being a second relatively positive potential, a bleeder circuit connected between said control point and a point at a third potential, negative with respect to said first potential, a connection from the control grid of said tube to an intermediate point on said bleeder circuit, a connection from the cathode of said tube to a point at a potential whose value is between the values of said first potential and said third potential, and an output connection from the junction of the anode of said tube and said rectifier, and in which when said control point potential is at or near its relatively negative value said tube is cut off, and when said control point potential is at or near its relatively positive value said tube conducts, whereby when said tube is conducting the potential of said output connection is maintained at or near said first potential.

According to the present invention there is further provided an electrical switching circuit which comprises a thermionic vacuum tube, a rectifier connected between the anode of said tube and a point at a first potential, said rectifier being poled in the direction of easy conductivity for current flowing from said point at said first potential towards said anode, a first control point whose potential can assume either one of two values, one being a relatively negative potential which is at or near said first potential and the other being a second relatively positive potential, a bleeder circuit connected between said control point and a point at a third potential negative with respect to said first potential, a connection from the control grid of said tube to an intermediate point on said bleeder circuit, a connection from the cathode of said tube to a point at a potential whose value is between the values of said first potential and said third potential, an output connection from the junction of the anode of said tube and said rectifier to the common point of a coincidence gate circuit, a connection including a resistance from said common point to a relatively positive biassing potential, at least one further control point which can assume either said first potential or a relatively positive potential, and a connection including a rectifier from each said further control point to said common point, said rectifier or rectifiers being poled in the direction of easy conductivity for current flowing from said common point to the respective control point, and in which when the potential of said first control point is at or near its relatively negative value said tube is cut off and exerts substantially no influence on said gate circuit, and when the potential of said first control point is at or near its relatively positive value the tube conducts, whereby when said tube is conducting the potential of said output connection is held at or near said first potential, thus inhibiting said gate circuit even if the potential of said further control point or the potentials of all said further control points assume said relatively positive value.

According to the present invention there is still further provided an electrical switching circuit which comprises a thermionic vacuum tube, a rectifier connected between the anode of said tube and a point at a first potential, said rectifier being poled in the direction of easy conductivity for current flowing from said point at said first potential towards said anode, a discharge gap having a resistance connected between its cathode and a point at said first potential, in which when said gap is quiescent the potential of its cathode is at or near said first potential and in which when said gap is discharging the potential of its cathode is at a second relatively positive potential, a bleeder circuit connected between the cathode of said gap and a point at a third potential negative with respect to said first potential, a connection from the control grid of said tube to an intermediate point on said bleeder circuit, a connection from the cathode of said tube to a point at a potential whose value is between the values of said first potential and said third potential, an output connection from the junction of the anode of said tube and said rectifier to the common point of a coincidence gate circuit, a connection including a resistance from the said common point to a relatively positive biassing potential, at least one further control point which can assume either said first potential or a relatively positive potential, and a connection including a rectifier from each said further control point to said common point, said rectifier or rectifiers being poled in the direction of easy conductivity for current flowing from said common point to the respective control point, and in which when said discharge gap is quiescent with its cathode potential at or near said first potential said tube is cut off and exerts substantially no effect on said gate circuit and when said gap is discharging with its cathode potential at or near said second relatively positive potential said tube conducts, whereby the potential of said output connection is held at or near said first potential, thus inhibiting said gate circuit even if the potential of said further control point or the potentials of all said further control points assume said relatively positive value.

Figure 2:
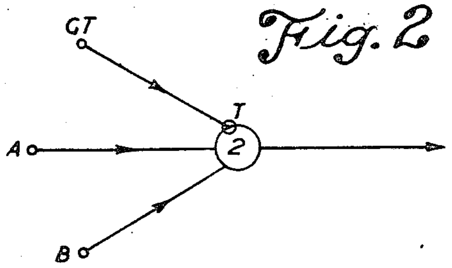

The invention will be described with reference to the accompanying drawings, in which:

Fig. 1 is a circuit diagram of a gating circuit in accordance with the invention; and Fig. 2 is a schematic diagram for a gating circuit.

In many switching applications use is made of coincidence gate circuits employing rectifiers such as metal rectifiers. In such a gate circuit, a common point, which is the output point of the circuit, is connected to a number of control points and to a source of biassing potential. The connection to the biassing source includes a resistance and each connection to a control point includes a rectifier.

The potential of a control point can assume either one of two distinct values, one being a relatively negative potential which is assumed for the present description to be at or near earth potential, and the other being a relatively positive potential. The rectifiers are so oriented as to be in the direction of easy conductivity for current flowing from the biassing source through the rectifiers to the respective control points. Thus the effect of the rectifiers is to hold the common point at the potential of the least positive of the control points. This arrangement is such that if nominally equal positive potentials are simultaneously present on all control points of a gate circuit, the potential of the common point of that gate circuit is substantially equal to the nominal control point potential. Thus, it will be seen that the common point, i. e. the output point of the gate circuit, only assumes a positive potential when positive potentials are simultaneously present on all of that gate's control points. As has been stated, this common point potential is equal to the least positive of the control point potentials.

When a control point assumes its positive value, the appropriate rectifier is said to be biassed positively. Only when all rectifiers of a gate circuit are biassed positively will the common point potential, and hence the output potential assume a positive value. The output connection from the common point of a gate circuit often includes a rectifier oriented in the direction of easy conductivity for current flowing from the common point to the next stage of the circuit. This rectifier is a decoupling rectifier.

In circuits using such gate circuits it is often desirable to have an inhibiting connection to a gate circuit, that is a connection in addition to the control point connections referred to, whose purpose is to prevent that gate circuit from delivering an output, i. e. to hold it closed in certain circumstances even if all of its control points assume their effective values, in the present example, their positive potentials.

In the drawings, Fig. 1 shows a circuit for accomplishing this, and a gate circuit of the type described above. Fig. 2 shows the conventional circuit schematic for such a circuit. The gate is shown as a ring having a number of inputs and a number within the ring. This number indicates the number of inputs of the gate which must be energised for the circuit to deliver an output. The third input to the ring, labelled T, has a small ring at the point at which it meets the main ring. This is the conventional symbol for an inhibiting input.

The gate to which the circuit according to the invention is connected has control points A and B connected to common point C by rectifiers W1 and W2 respectively. Also connected to C is the resistance R1, whose other end is connected to a positive biassing source. The output connection from C is via a decoupling rectifier W3. In the absence of any inhibiting action, the gate gives a positive going output when the rectifiers W1 and W2 are simultaneously biassed positive from their respective control points.

The inhibiting circuit is controlled from a gas tube GT whose normal positive going output 1 may be used for controlling other gates in any well known manner. The cathode is also connected to one end of a bleeder circuit R2—R3 whose other end is connected to a negative potential, for instance —110 volts. The values of R2 and R3 and of R4, the cathode resistance of GT, are such that with GT quiescent and its cathode at or near earth potential the grid of the tube V which is connected to the bleeder is held at such a potential that V is cut off. The cathode of V is also connected to a bleeder R5, R6 extending between the negative potential point and earth. This holds the cathode normally at about —55 volts in the present example. The total value of R2 and R3 is so high that the bleeder current flowing in R4 is negligible.

In this condition, therefore, the tube V is cut off, and the potential of its anode is therefore unaffected by tube GT. The anode of V is connected to the common point C of the gate (or to the common points of several gates) to be inhibited by it, and also via a rectifier W4 to earth.

Hence when V is cut off, the circuit shown has substantially no effect on the gate circuit or circuits controlled thereby since a positive potential at a gate control point tends to block the rectifier W4, i. e. to bias it to its high resistance condition when it is equivalent to a very high resistance connected to earth.

When GT discharges, current flow caused thereby in R4 makes the cathode potential go positive and thus the grid voltage of V rises to a value sufficient to cause V to conduct. Current then flows from earth via W4, the anode-cathode space of V, and the resistance R5 to the negative potential point. This current flow via W4 causes the anode of V to be held at, or near, earth potential, thus inhibiting all of the gates connected thereto.

The rectifier W5 is only needed when several gates are to be inhibited by tube V and serves to prevent mutual interference between these gates.

When V is conducting, the circuit's output impedance is substantially equal to the forward resistance of W5. This can be made as low as is desired by suitable choice of W4.

The circuit is especially suitable for use when the output of one cathode of a multi-gap tube is used to inhibit one or more gates, since in that case it is obviously impossible to take the inhibiting output from the single anode of the tube. However, the circuit is by no means limited to such a use.

The action of the circuit can be improved by connecting a resistance R7 from the anode of the tube V to a point at a positive potential such as 60 volts. The output connection from the anode of V is then held at this positive potential when the tube is cut off. This gives a more stable circuit than without this resistance.

In the circuit and the modification thereto which have been described, it is assumed that the relatively negative gate controlling potential is earth potential and the relatively positive gate controlling potential is of the order of +50 volts. With other values of gate controlling potentials suitable adjustment is necessary to the potentials used in the circuit shown.

While the principles of the invention have been described above in connection with specific embodiments, and particular modifications thereof, it is to be clearly understood that this description is made only by way of example and not as a limitation on the scope of the invention.

What is claimed is:

1. An electrical switching circuit which comprises a thermionic vacuum tube, a rectifier connected between the anode of said tube and a point at a first potential, said rectifier being poled in the direction of easy conductivity for current flowing from said point at said first potential towards said anode, a control point whose potential can assume either one of two values one being a relatively negative potential which is at or near said first potential and the other being a second relatively positive potential, a bleeder circuit connected between said control point and a point at a third potential, negative with respect to said first potential, a connection from the control grid of said tube to an intermediate point on said bleeder circuit, a connection from the cathode of said tube to a point at a potential whose value is between the values of said first potential and said third potential, and an output connection from the junction of the anode of said tube and said rectifier, in which when said control point potential is at or near its relatively negative value said tube is cut off, and when said control point potential is at or near its relatively positive value said tube conducts, whereby when said tube is conducting the potential of said output connection is maintained at or near said first potential.

2. A circuit as claimed in claim 1 and further comprising a second bleeder circuit connected between said point at said first potential and a point at a relatively negative potential, the cathode of said tube being connected to an intermediate point on said bleeder circuit.

3. A circuit as claimed in claim 1 and further comprising a second bleeder circuit connected between said point at said first potential and said point at said third potential, the cathode of said tube being connected to an intermediate point on said second bleeder circuit.

4. A circuit as claimed in claim 1 and which further comprises a connection including a resistance from the anode of said tube to a point at a potential positive with respect to said first potential.

5. An electrical switching circuit which comprises a thermionic vacuum tube, a rectifier connected between the anode of said tube and a point at a first potential, said rectifier being poled in the direction of easy conductivity for current flowing from said point at said first potential towards said anode, a first control point whose potential can assume either one of two values, one being a relatively negative potential which is at or near said first potential and the other being a second relatively positive potential, a bleeder circuit connected between said control point and a point at a third potential negative with respect to said first potential, a connection from the control grid of said tube to an intermediate point on said bleeder circuit, a connection from the cathode of said tube to a point at a potential whose value is between the values of said first potential and said third potential, an output connection from the junction of the anode of said tube and said rectifier to the common point of a coincidence gate circuit, a connection including a resistance from said common point to a relatively positive biassing potential, at least one further control point which can assume either said first potential or a relatively positive potential, and a connection including a rectifier from each said further control point to said common point, said rectifier or rectifiers being poled in the direction of easy conductivity for current flowing from said common point to the respective control point, and in which when the potential of said first control point is at or near its relatively negative value said tube is cut off and exerts substantially no influence on said gate circuit, and when the potential of said first control point is at or near its relatively positive value the tube conducts, whereby when said tube is conducting the potential of said output connection is held at or near said first potential, thus inhibiting said gate circuit even if the potential of said further control point or of the potential of all said further control points assume said relatively positive value.

6. A circuit as claimed in claim 5 and which comprises a plurality of coincidence gate circuits, and a connection from the common point of each coincidence gate circuit to said output connection including a rectifier poled in the direction of easy conductivity for current flowing from said common point to said output connection, whereby said rectifiers act as decoupling rectifiers for said gate circuit.

7. An electric switching circuit which comprises a thermionic vacuum tube, a rectifier connected between the anode of said tube and a point at a first potential, said rectifier being poled in the direction of easy conductivity for current flowing from said point at said first potential towards said anode, a discharge gap having a resistance connected between its cathode and a point at said first potential, in which when said gap is quiescent the potential of its cathode is at or near said first potential and in which when said gap is discharging the potential of its cathode is at a second relatively positive potential, a bleeder circuit connected between the cathode of said gap and a point at a third potential negative with respect to said first potential, a connection from the control grid of said tube to an intermediate point on said bleeder circuit, a connection from the cathode of said tube to a point at a potential whose value is between the values of said first potential and said third potential, an output connection from the junction of the anode of said tube and said rectifier to the common point of a coincidence gate circuit, a connection including a resistance from said common point to a relatively positive biassing potential, at least one further control point which can assume either said first potential or a relatively positive potential, and a connection including a rectifier from each said further control point to said common point, said rectifier or rectifiers being poled in the direction of easy conductivity for current flowing from said common point to the respective control point, and in which when said discharge gap is quiescent with its cathode potential at or near said first potential said tube is cut off and exerts substantially no effect on said gate circuit and when said gap is discharging with its cathode potential at or near said second relatively positive potential said tube conducts, whereby the potential of said output connection is held at or near said first potential, thus inhibiting said gate circuit even if the potential of said further control point or the potentials of all said further control points assume said relatively positive value.

8. A circuit as claimed in claim 7 and which comprises a plurality of coincidence gate circuits, and a connection from the common point of each said coincidence gate circuit to said output connection including a rectifier poled in the direction of easy conductivity for current flowing from said common point to said output connection, whereby said rectifiers act as decoupling rectifiers for said gate circuits.

References Cited in the file of this patent

UNITED STATES PATENTS

| Number | Name | Date |
|---|---|---|
| 2,557,729 | Eckert, Jr. | June 19, 1951 |
| 2,576,026 | Meacham | Nov. 20, 1951 |
| 2,597,796 | Hindall | May 20, 1952 |